US011093892B2

(12) United States Patent
Bostick et al.

(10) Patent No.: US 11,093,892 B2
(45) Date of Patent: Aug. 17, 2021

(54) REALTIME PRODUCT BACKUP DELIVERY

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 1199 days.

(21) Appl. No.: 15/095,223

(22) Filed: Apr. 11, 2016

(65) Prior Publication Data

US 2017/0293886 A1    Oct. 12, 2017

(51) Int. Cl.
*G06Q 10/08*    (2012.01)

(52) U.S. Cl.
CPC ................ *G06Q 10/08355* (2013.01)

(58) Field of Classification Search
CPC .......... G06Q 10/08355; G01S 19/42
See application file for complete search history.

(56) References Cited

U.S. PATENT DOCUMENTS

| | | | |
|---|---|---|---|
| 2002/0188401 A1 | 12/2002 | Bridegforth | |
| 2006/0136237 A1* | 6/2006 | Spiegel | G06Q 10/08 705/330 |
| 2009/0043617 A1* | 2/2009 | Thomas | G06Q 10/00 705/28 |
| 2009/0094116 A1* | 4/2009 | Olagunju | G06Q 10/06 705/14.26 |
| 2013/0332292 A1* | 12/2013 | Angert | G06Q 10/087 705/15 |
| 2014/0222711 A1 | 8/2014 | Tibbs et al. | |
| 2015/0193731 A1 | 7/2015 | Stevens et al. | |
| 2016/0104112 A1* | 4/2016 | Gorlin | G06F 16/29 705/338 |

(Continued)

OTHER PUBLICATIONS

"Gerald Reiner, Raw material procurement with fluctuating prices using speculative inventory under consideration of different contract types and transport modes, 2013, p. 2" (Year: 2013).*

(Continued)

*Primary Examiner* — Kevin H Flynn
*Assistant Examiner* — Ibrahim N El-Bathy
(74) *Attorney, Agent, or Firm* — David K. Mattheis; Maeve M. Carpenter

(57) ABSTRACT

Navigation data to a first location on a delivery route for a first delivery is sent to a navigation components of a delivery vehicle. Upon receipt of a notification that the first delivery to the first location is canceled, the availability of a backup delivery is determined. The location of each of a predetermined set of potential buyers is compared to the current location of the delivery vehicle, and in real-time, a consumption of resources is calculated for a backup delivery and the return the one or more items to a designated return location. A determination of whether the backup delivery to a particular potential buyer is favorable as compared to the return the one or more items to the designated return location and, if favorable, navigational instructions are transmitted in real-time to the delivery vehicle to deliver the one or more items to the particular potential buyer.

17 Claims, 4 Drawing Sheets

(56) References Cited

U.S. PATENT DOCUMENTS

2016/0292634 A1* 10/2016 Mehring ............ G06Q 10/0832
2017/0261977 A1*  9/2017 High ................ B64C 39/024
2018/0268348 A1*  9/2018 Guan ................ G06Q 10/08
2018/0357591 A1* 12/2018 Bell ................. G06Q 30/0261

OTHER PUBLICATIONS

UltraShipTMS, "Flights of Fancy Also Benefit from Automated Routing", Posted on Dec. 16, 2013, in Blog, TMS Solution for Amazaon Drone Delivery, 6 pages.

* cited by examiner

US 11,093,892 B2

REALTIME PRODUCT BACKUP DELIVERY

FIELD OF THE INVENTION

The present invention relates generally to the field of delivery, and more particularly to determining a backup delivery of an undeliverable product.

BACKGROUND OF THE INVENTION

Delivery services used planned routes to cover deliveries to particular areas. Densely populated residential areas, as well as businesses may use common or repeated delivery routes to cover delivery demand. Providers of delivery services as well as the retail sources of the items to be delivered, must include consideration of deliveries that are planned, but cannot be made due to a variety of reasons, including last-minute order cancellations.

Storage and return of items originally designated for delivery are part of cost considerations for delivery services and remote sales businesses, and are often met by passing on cost or inconvenience to consumers. Consumers, on the other hand are, not surprisingly, attracted to purchase opportunities that accommodate cancellation at any time after an order is placed.

SUMMARY

Embodiments of the present invention disclose a method, computer program product, and system for a back-up delivery by a delivery vehicle. The method for a back-up delivery by a delivery vehicle provides for one or more processors to transmit to navigational components of a delivery vehicle, navigation data to a first location on a delivery route for a first delivery, in which the delivery route is determined from the navigation data that is received by a communications component of the delivery vehicle and processed by a GPS component of the delivery vehicle, which has access to navigational mapping data. One or more processors receive a notification that the first delivery to the first location is canceled, such that the first delivery includes a planned delivery of one or more items. One or more processors determine whether a backup delivery is available by accessing a location of each potential buyer of a pre-determined set of potential buyers of the one or more items, and comparing each location to the current location of the delivery vehicle, as determined by the GPS component of the delivery vehicle. One or more processors calculate in real-time, a consumption of resources of the delivery vehicle to provide a backup delivery of the one or more items to each potential buyer of the pre-determined set of potential buyers. One or more processors calculate in real-time, a consumption of resources of the delivery vehicle to return the one or more items to a designated return location, wherein the return route of the delivery vehicle to the designated return location is calculated by use of the GPS location of the delivery vehicle and access to the navigational mapping data. One or more processors determine whether the consumption of resources to perform the backup delivery to a particular potential buyer of the pre-determined set of potential buyers is favorable as compared to the consumption of resources to return the one or more items of the first delivery to the designated return location, and more favorable as compared to the consumption of resources of the delivery vehicle to perform the backup delivery to other potential buyers of the pre-determined set of potential buyers, and in response to determining the consumption of resources of the delivery vehicle to perform the backup delivery is favorable, one or more processors transmit in real-time, navigational instructions to the navigational components of the delivery vehicle to deliver the one or more items of the first delivery to the potential buyer at a second location.

DETAILED DESCRIPTION

Figure 1:
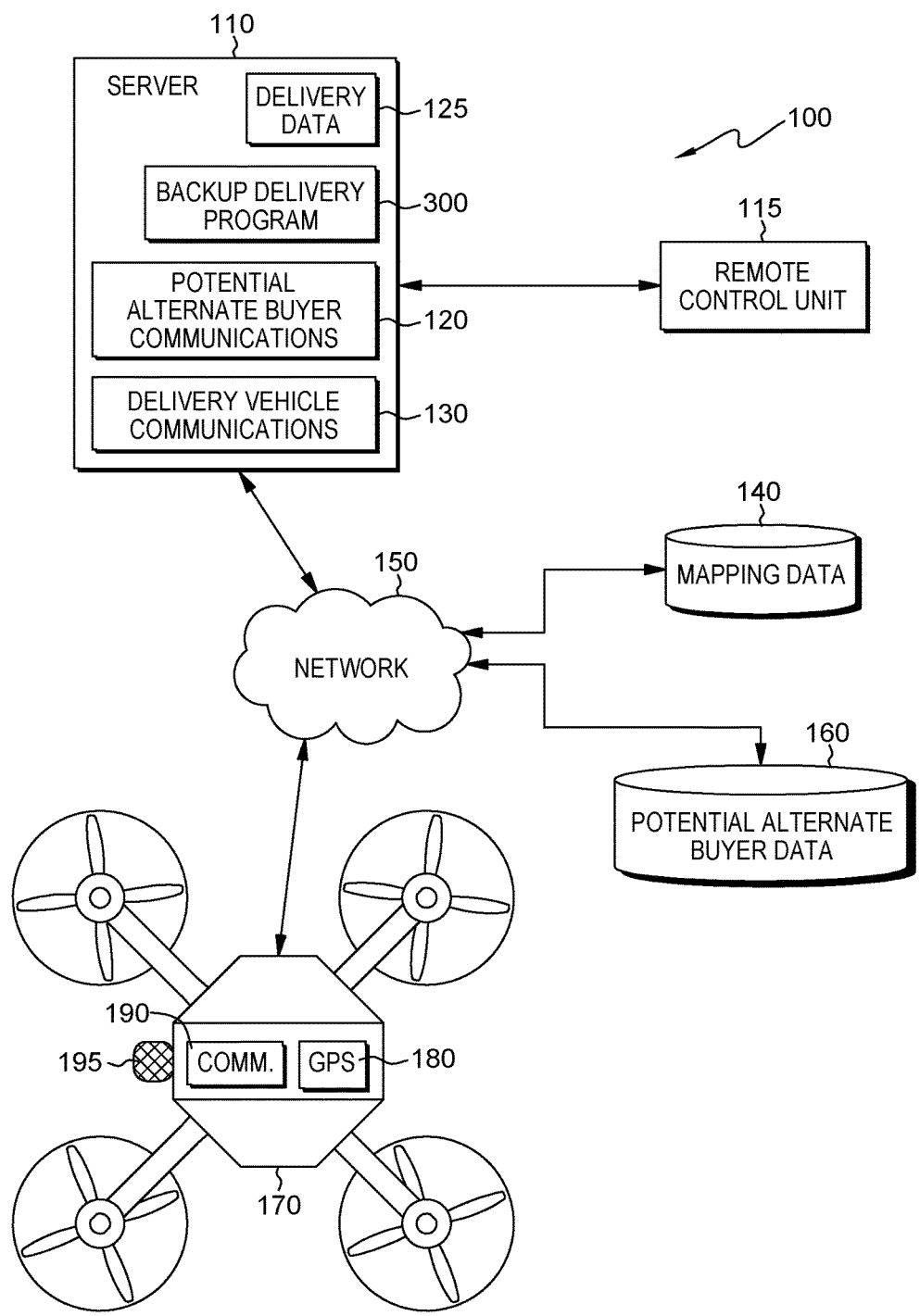
FIG. 1 is a functional block diagram illustrating a distributed data processing environment, in accordance with an embodiment of the present invention.

Embodiments of the present invention recognize that cancellation of delivery of ordered items creates efficiency issues in the delivery service industry. Canceled orders that are in route of delivery, create lost opportunity of delivery, require return and storage that occupies space. Undeliverable products accrue cost due to requiring storage and return to a supplier or a redundant delivery effort. Embodiments of the present invention provide for handling cancelled deliveries in a way that may be more meaningful and/or profitable to a business. Some embodiments determine whether the return of a product to be delivered is too costly, and if an alternative backup delivery is available, the alternative delivery may be performed based on considering whether the cost and revenue of the alternate delivery are more favorable than the consolidated costs and revenue associated with the return, restocking, and potential re-delivery of the product. It is acknowledged that the use of the term "product" is not intended to limit what is delivered and includes any deliverable set of one or more items.

Areas of dense residential population, or areas with multiple retailers or businesses, may experience multiple demands for delivery of the same items. Using data access of current and pending committed orders for delivery of products, as well as indicated interests by potential alternate buyers, embodiments of the present invention determine whether an alternative delivery can be made as a backup for a primary delivery that has been canceled or cannot be delivered for other reasons. Embodiments of the present invention determine whether the delivery vehicle is within a pre-determined proximity of a secondary location to which the backup delivery can be made, and if so, notifies the delivery vehicle to make the backup delivery to the secondary location.

In some embodiments of the present invention, a delivery plan intends for the delivery vehicle to follow a delivery route that may include more than one delivery location. A potential backup delivery involves the determination of the proximity of a backup delivery location relative to the closest point of the planned primary delivery route of the delivery vehicle. In other embodiments of the present invention, the delivery vehicle is in progress of making a single delivery, and the proximity of a backup delivery location is determined from a return route path that begins from the present location of the delivery vehicle to a location at which the product(s) to be delivered are stored, such as warehouse as an origin point of the delivery.

In some embodiments of the present invention, if the proximity of the backup delivery at a secondary location exceeds a pre-determined distance, the delivery vehicle completes a return route without making the back-up delivery to the secondary location. In some embodiments of the present invention, a cost of a delivery to a back-up secondary location is compared to a cost of the delivery vehicle returning to a point at which the item(s) of the delivery can be stored, as well as the additional cost of re-stocking, or returning the product(s) to a supplier, or arranging for another delivery of the product(s). In some embodiments of the present invention, the determination of a back-up delivery location, a determination of proximity of the back-up delivery location, and a cost benefit of back-up delivery or return of undelivered product(s), occurs in real-time, while the delivery vehicle is on the initial planned delivery route.

In some embodiments, the delivery service receives information prior to the delivery regarding potential alternate buyers that are interested in the product being delivered if certain terms, usually price, are met. For example, the product provider or the delivery service may solicit and receive input from users that are interested in receiving a particular product at a designated price, such as if the product is discounted twenty-five percent of an advertised retail price. The terms of the potential alternative buyer were accepted by the delivery service ahead of time (i.e., prior to the delivery). In the event of a primary delivery being canceled or unable to be fulfilled, a decision to travel and deliver the product to the potential alternate buyer, as a back-up delivery, is based on the cost of delivery being favorable to the cost of returning the product to the warehouse, and preparing the product for another delivery or return.

In other embodiments of the present invention, additional considerations are included in the decision making of whether to deliver the product to a potential alternate buyer at a discounted price or return the product to a storage point, such as a warehouse. Additional factors, such as whether anticipated demand for the product is high and the product may "sell-out" at the retail price, and the predicted "shelf time" for the product, in which other profitable items may occupy the shelf space, are taken into consideration. Other considerations may include whether the product has an associated expiry date, after which the product may not be delivered or may not retain any value, for example certain foods, medical supplies, or tickets to an event. Additionally, embodiments of the present invention may be applied to existing delivery vehicles, remote controlled, robotic, or automated delivery vehicles, or delivery devices.

Some embodiments of the present invention include the use some or all of the following components: at least one delivery vehicle, a real-time communication capability between a delivery vehicle and computing device providing delivery related information and/or remote control of the delivery vehicle, a real-time communication capability with potential back-up delivery recipients, GPS functionality for delivery vehicle, navigation mapping data of the delivery area, a knowledge base of delivery customers, a knowledge base of potential delivery customers based on data received from one or more social media sites containing user generated information, and natural language processing of social media site content regarding interest in delivery item(s).

It is acknowledged that in some embodiments of the present invention, the decision to proceed with a backup delivery by the delivery service may include previous negotiations and agreements with one or more retail businesses regarding an amount of discount to offer, and may include information regarding the location and additional conditions associated with delivery of the product to be considered in decision making. For purposes of brevity and clarity, references to the "delivery service" include the pre-established negotiations, agreements, and conditions of consideration made with one or more retail businesses choosing the delivery service to perform product deliveries.

There are various scenarios that represent different considerations in employing a backup delivery of a primary delivery that is canceled or determined to be undeliverable for other reasons. In a simple embodiment, the delivery service business would be made privy to information regarding potential alternate buyers that are interested in the same product included in the primary delivery, but only at a discounted price. In this scenario, a user might have specified that they are waiting for the product and will accept delivery if the price falls by twenty-five percent, for example. The terms offered by the potential customer, or alternate buyer, are reviewed ahead of time, and if accepted by the delivery service, establish an agreement, such as a contract between the potential alternate buyer and the delivery service, to be used in cases in which a delivery underway, cannot be completed. The decision whether to transport the returned product to the potential alternative buyer as a backup delivery, rather than returning the product to the originating point, such as a delivery warehouse, is based on whether or not a pre-determined threshold of cost is crossed for returning the product to the warehouse, and performing re-stocking activities. In some embodiments of the present invention, the current scenario considers the round trip cost of going back to the warehouse, restocking, and then performing another delivery to a customer at some future time. The decision to deliver to an alternate buyer or return the product is based on whether the cost is favorable to the delivery service.

In another scenario, a knowledge base of potential alternate buyers willing to take delivery of the product at a designated discounted price, is accessed. Additional considerations are included in this case, beyond the cost of returning the product to the delivery point of origin and restocking activities. Information indicating whether the product is in high demand or may even "sell-out," as well as estimated shelf time for the product, if returned, are included in consideration of whether to accept and perform a backup delivery of the product. High demand or potential "sell-out" conditions may indicate that retail or even premium prices may be obtained for delivery, and experience high probability of short shelf-life duration. Accepting discounted price deliveries under high demand conditions may result in missed profit opportunities. Embodiments of the present invention acknowledge that contracted arrangements with potential alternate buyers to purchase a product as a backup delivery at a discounted price may require a binding commitment, but the duration of the commitment cannot be indefinite and may have defined limitations. Various implementation conditions associated with embodiments of the present invention may be applied.

Another possible condition considered in making the backup delivery decision may include whether the product is associated with a possible expiration. Expirations, for example, may have to do with degradation of the product or may be associated with a scheduled event. Returning the product to the originating warehouse for return and/or restocking is not favorable if the product loses its value within the return process. For example, tickets purchased to a sporting event scheduled to occur within 48 hours will lose all of their value if they cannot be returned and redistributed prior to the end of the 48-hour period. For conditions of expiration, additional consideration is made to obtain revenue for the product while the product still retains value.

Yet another scenario in which a product is on route for the primary delivery when it is determined that the order is canceled, or the delivery vehicle cannot make the delivery to the primary location. A set of users, as potential non-contracted alternate buyers, identified from a knowledge base that includes information of users within a determined radius of the delivery vehicle, receive a notification informing them of the availability of the product, and in some embodiments of the present invention, the cost of the product may be discounted to encourage the potential alternate buyers to buy the product "on the fly." The first user to accept receives delivery of the product. This scenario makes use of a knowledge base that is generated ahead of the primary delivery and is continually updated. The knowledge base receives information from natural language processing and semantic analysis of available media sources, such as social media content that includes user generated information. The information is used to determine users that are most likely to be interested in the product and how to contact them. In some embodiments, the social media sources may be from a retailer's site, in which a user may indicate a "wish list" or other indication of interest (i.e., an un-purchased check out cart). Users may be able to post their interest in various products, but not necessarily make a commitment to purchase at a particular price, if offered.

The present invention will now be described in detail with reference to the Figures. FIG. 1 is a functional block diagram illustrating a distributed data processing environment, generally designated 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server 110, which is depicted as hosting delivery vehicle communications 130, potential alternate buyer communications 120, delivery data 125, and backup delivery program 300; and includes remote control unit 115, mapping data 140, potential alternate buyer data 160, and delivery vehicle 170. Delivery vehicle 170 is depicted as including GPS unit 180, communications unit 190, and camera 195, all interconnected via network 150.

Network 150 can be, for example, a local area network (LAN), a telecommunications network, a wide area network (WAN), such as the Internet, a virtual local area network (VLAN), or any combination that can include wired, wireless, or optical connections. Network 150 can include one or more wired and/or wireless networks that are capable of receiving and transmitting data, voice, and/or video signals, including multimedia signals that include voice, data, and video information. In general, network 150 can be any combination of connections and protocols that will support communications between delivery vehicle communications 130, potential alternate buyer communications 120, and backup delivery program 300, hosted on server 110; and mapping data 140, potential alternate buyer data 160, and delivery vehicle 170, in accordance with embodiments of the present invention.

Delivery vehicle 170, as depicted, is an un-manned remotely operated delivery vehicle capable of flight, and may include computer processing components enabling communication and receipt of navigational data sent to delivery vehicle communications 130 of server 110, and further processed by GPS unit 180. In some embodiments of the present invention, delivery vehicle 170 may be a manned vehicle operating on existing roadways. In yet other embodiments, delivery vehicle 170 may be a fully automated delivery vehicle, using data from GPS unit 180 and data from mapping data 140 as some of the navigational components of delivery vehicle 170, to navigate from a point of origin, such as a delivery service warehouse, to a delivery destination. In some embodiments, delivery vehicle 170 as a fully automated ground-based vehicle, makes use of one or more of roadways, paths, sidewalks, or building paths. In populated areas with multi-storied residence buildings, delivery vehicle may navigate floors, hallways, and elevators by use of GPS unit 180 and floor plans included in mapping data 140, or may be operated by use of remote control unit 115 and video feedback from camera 195. In another embodiment delivery vehicle is an automated or remote controlled vehicle capable of flight. In yet other embodiments, delivery vehicle 170 includes a human delivery agent using any motorized or manually propelled wheeled device, or traveling on foot to make deliveries.

Delivery vehicle 170 is configured to contain, transport, and release upon destination, a product that may include one or more items. Delivery vehicle 170 includes global positioning system (GPS) unit 180, which receives transmissions from a set of global positioning satellites to determine a precise position of delivery vehicle 170. When used in combination with mapping data 140, the precise position of delivery vehicle 170, as determined by GPS 180, is used to provide a geographical location of delivery vehicle 170 within the mapping information of mapping data 140.

Delivery vehicle 170 also includes communications unit 190, which sends and receives information (information may include one or a combination of data, instructions, video, or audio), to provide position and location information to backup delivery program 300, as well as receiving remote navigational instructions. Communications unit 190 receives navigational information, which in some embodiments of the present invention, may be operational instructions for a remotely controlled delivery vehicle 170. In other embodiments, communications unit 190 receives navigational instructions that are performed by a user of a manned delivery vehicle or, for a robotic delivery vehicle, performed by instructions received from remote control unit 115, or performed by components of delivery vehicle 170, which may include internal and external hardware components, as depicted and described in further detail with respect to FIG. 4.

In some embodiments of the present invention, delivery vehicle 170 includes camera 195, which is used to assist in navigation of delivery vehicle 170 and may provide video feedback to remote control unit 115 via communications unit 190, for remotely controlled versions of delivery vehicle 170. In some embodiments, camera 195 provides video data that is used to determine whether there are conditions making the intended delivery undeliverable.

Potential alternate buyer data 160 is a knowledge-based repository of information associated with potential buyers that may be considered for backup delivery of a product in which the primary delivery is canceled or determined to be undeliverable. For a given area of delivery, potential alternate buyer data 160 may include a pre-defined set of potential buyers. In some embodiments of the present invention, potential alternate buyer data 160 includes data regarding the pre-defined sets of potential buyers that have contractually agreed to purchase a product if the product is available at a designated price. In some embodiments, potential alternate buyer data 160 includes data regarding users (potential buyers) that have expressed or documented interest in purchasing a product at a discounted price, but have not committed to such a purchase through a contract agreement with the delivery service (and in some embodiments, in combination with a retail provider). In other embodiments, potential alternate buyer data 160 includes data regarding users who, through analysis of accessible social media content containing user generated information, or activity on product provider sites, have indicated potential interest in a product.

In some embodiments of the present invention, data included in potential alternate buyer data 160 is obtained by use of natural language processing tools, semantic analysis, and in some embodiments, sentiment analysis. The natural language processing tools are used to determine the content and meaning from online text content of accessible social media sites, or retail provider sites, such as wish lists, online shopping carts, and social media sites. The natural language, sentiment, and semantic processing tools are also used to analyze content on sites designated for users to commit to purchase of a product if available at a discounted price, as well as sites designated for users to indicate interest in purchase of a product if available at a discounted price, without a commitment to actually purchase at the discounted price. In other embodiments, user data in potential alternate buyer data 160 may be provided directly by potential users that wish to be considered for backup delivery, for example, by filling out and submitting information in a form. Potential alternate buyer data 160 includes location data of the user, and may include credit score, accepted or interested discount price, and pre-established payment information of the user.

Mapping data 140 is a repository of map data used for navigation of delivery vehicle 170 from a point of origin to a delivery location. Mapping data 140 includes updated information of roadways, and residential locations by address and/or GPS coordinate. In some embodiments of the present invention, mapping data 140 may include floor plans and other information accommodating delivery of products to a single resident location, or multi-resident location.

In some embodiments of the present invention, remote control unit 115 remotely controls delivery vehicle 170. Remote control unit 115 includes a user interface that provides information regarding the current position of delivery vehicle 170, and information associated with the navigation and progress of the delivery underway. In some embodiments of the present invention, a user operating remote control unit 115 controls and directs the motion of delivery vehicle 170 by input of navigational instructions received and transmitted by delivery vehicle communications 130. Feedback from delivery vehicle 170 is transmitted from camera 195 and communications unit 190 of delivery vehicle 170, and received by delivery vehicle communications 130 of server 110, and provided as input to user interfaces of remote control unit 115. In embodiments in which delivery vehicle 170 is not remotely controlled, remote control unit 115 may serve an auxiliary role of manually augmenting information sent to delivery vehicle 170.

Server 110 provides computing and operational support of delivery vehicle communications 130, potential alternate buyer communications 120 and backup delivery program 300. In some embodiments of the present invention, server 110 is a host for delivery vehicle communications 130, potential alternate buyer communications 120, delivery data 125, and backup delivery program 300, as depicted in FIG. 1. In other embodiments, server 110 is remotely connected to one or more of, remote control unit 115, delivery data 125, delivery vehicle communications 130, potential alternate buyer communications 120, and backup delivery program 300, which may be hosted on other devices (not shown), but are connected via network 150.

In some embodiments of the present invention, server 110 can be a management server, a web server, a mobile computing device, or any other electronic device or computing system capable of receiving, sending, and processing data, and supporting the operational functions of backup delivery program 300. In other embodiments, server 110 can represent a server computing system utilizing multiple computers as a server system, such as in a cloud computing environment. In still other embodiments, server 110 can be a laptop computer, a tablet computer, a netbook computer, a personal computer (PC), a desktop computer, a personal digital assistant (PDA), a smart phone, or any programmable electronic device capable of performing programmable instructions of backup delivery program 300, and enabling delivery vehicle communications 130, potential alternate buyer communications 120, receiving control and navigation input from remote control unit 115, and enabling access of data from mapping data 140 and potential alternate buyer data 160, within distributed data processing environment 100 via network 150. In another embodiment, server 110 represents a computing system utilizing clustered computers and components (e.g., database server computers, application server computers, etc.) that act as a single pool of seamless resources when accessed within distributed data processing environment 100. Server 110 may include internal and external hardware components, as depicted and described in further detail with respect to FIG. 4.

Delivery vehicle communications 130 provides navigational information to delivery vehicle 170 and receives video input, and location input from camera 195 and GPS unit 180 respectively, by way of communication unit 190 of delivery vehicle 170, and network 150. In some embodiments of the present invention, delivery vehicle communications 130 receives control and directional instructions from remote control unit 115, for remote control of delivery device 170, and for embodiments in which delivery vehicle 170 is manned, delivery vehicle communications 130 provides navigational information from access to mapping data 140 and backup delivery program 300.

Potential alternate buyer communications 120 is a communications module that transmits information regarding the availability and backup delivery of a product that is currently undeliverable. In some embodiments of the present invention, potential alternate buyer communications 120 sends messages, such as short message service (SMS) text messages, to potential buyers of a product that is undeliverable, which are determined to be at locations that are within parameter limits of a backup delivery of the product. In other embodiments, potential alternate buyer communications 120 sends audible messages that are partially or fully machine generated. The sent messages inquire whether the potential buyer is interested in purchasing the product at a designated price. Potential alternate buyer communications 120 receives feedback from one or more potential buyers regarding agreement to purchase the product as a backup delivery. In some embodiments of the present invention, potential alternate buyer communications 120 is configured to transmit one or more of: text messages, voice-synthesized audio messages, email messages, and social media site messages.

In some embodiments of the present invention, the message transmitted to potential buyers of the product as a backup delivery, includes a link to a website at which the potential buyer can accept the terms of purchase and make payment for the product, or a form confirming acceptance of the purchase terms and payment. In other embodiments the potential buyer of the product as a backup delivery may have completed a pre-registration of information, and need only indicate a confirmation of accepting the backup delivery from the message received from potential alternate buyer communications 120. In other embodiments of the present invention, potential alternate buyer communications 120 sends and receives messages associated with bidding to purchase an available product as a backup delivery auction item. The messages are sent out, by potential alternate buyer communications 120, to potential buyers that are known to have interest in purchasing the product for a discounted price, indicating a current bid for the product. Messages are received by potential alternate buyer communications 120 that include a next bid amount made by a particular potential buyer. The received messages that include the next bid amount are received by backup delivery program 300, which determines and prepares outgoing messages to potential buyers via potential alternate buyer communications 120.

In some embodiments of the present invention, once a minimum bid amount is received, and bidding concludes or remains idle for a defined time period, the product is delivered to the potential buyer making the last accepted bid. If a minimum bid, which is pre-determined for a product, is not received, the backup delivery may be canceled and the product returned to the point of origin of the delivery. In some embodiments, if the minimum bid is received, bidding may conclude based on a time limit associated with the duration of delivery by the delivery vehicle, and further bids of greater amounts may be ignored.

Delivery data 125 includes information regarding the delivery of the product as well as delivery related information. Delivery data 125 includes information regarding the delivery location, the delivery vehicle making the delivery of the product, and GPS coordinates of the point of origin of the delivery vehicle. In some embodiments of the present invention, delivery data 125 receives data from potential alternate buyer data 160, and mapping data 140, for a current delivery. In some embodiments, delivery data 125 includes detailed information regarding the product to be delivered, including the known or projected market demand for the product, estimated shelf life of the product if not delivered, and whether the product is associated with an expiration condition. In some embodiments, delivery data 125 includes information regarding an affordable range of coverage of delivery vehicle 170 extending from a planned delivery route of the product to be delivered, which may be used to determine potential backup delivery candidates, if needed. In some embodiments, delivery data 125 includes a set of potential backup delivery candidates previously determined by backup delivery program 300 for a particular product, each candidate may be designated as to whether they have committed to a purchase at a discounted price, interested in a purchase at a discounted price, or determined to be interested in the product to be delivered. In other embodiments, the potential backup delivery candidates are determined in real-time by backup delivery program 300, upon receiving information indicating the current delivery is canceled or undeliverable.

Delivery data 125 also includes information regarding the cost of the delivery, the cost of returning a product undelivered, the cost associated with restocking or return of the product to a retail provider, and a unit cost by distance of a delivery.

In some embodiments of the present invention, backup delivery program 300 is operationally performed by server 110, and in response to receiving input that a current delivery of a product is canceled or otherwise undeliverable, determines whether there is a potential backup delivery for the product, and if so, initiates messages to potential buyers of the backup delivery product. Receiving a confirmation of agreement to purchase the product as a backup delivery, backup delivery program 300 provides instruction to navigate delivery vehicle 170 to the backup destination. Backup delivery program 300 receives input indicating the primary delivery in-route is canceled or not deliverable. In some embodiments, the notification of cancellation or inability to deliver is received from an external source. In other embodiments, feedback from delivery vehicle 170 (e.g., video from camera 195), may indicate the primary delivery is not possible or advisable. In other embodiments, backup delivery program 300 may be integrated with computing component included in delivery vehicle 170 and wirelessly connects to data resources.

Backup delivery program 300 also receives location and motion information of delivery vehicle 170 from GPS unit 180 via communications unit 190, received by delivery vehicle communications 130. Data from potential alternate buyer data 160 is accessed and received by backup delivery program 300 to determine potential backup recipients of the product of the current delivery that are previously committed to buyers or agree to purchase the product of the current delivery in real-time. As previously described, potential alternate buyers may be those who have contractually agreed to purchasing the product at a designated discounted price, those who have indicated an interest, but not a commitment to purchase the product at a discounted price, and those who have been determined to have an interest in purchasing the product, by analysis of social media, retail websites, or direct input by users. Backup delivery program 300 uses position data of delivery vehicle 170 from GPS 180, map data from mapping data 140, and current delivery information from delivery data 125, to determine a potential range of delivery vehicle 170 to make a backup delivery. In some embodiments of the present invention, backup delivery program 300 broadly determines the consumption of resources of delivery vehicle 170 that are required to perform the backup delivery to a potential buyer.

Consumption of resources may include, but are not limited to: time, energy or fuel, labor, and potential risks, and may be represented by an associated cost. For example, the cost of fuel to proceed from the current location of the delivery vehicle to the backup delivery location within a range or proximity of the current delivery vehicle location, the duration of time consumed that may have labor costs or other opportunity costs, and potential risk costs associated with the area or conditions of the backup delivery, may be aggregated to determine the estimated consumption of resources for the backup delivery. In some embodiments of the present invention, current delivery information and backup delivery information may be pre-determined and accessed by backup delivery program 300 from delivery data 125.

Backup delivery program 300 searches data within potential alternate buyer data 160 to determine whether a backup delivery to a potential alternate buyer is possible within a range of distance from the current location of delivery vehicle 170, and continuing along a return path of delivery vehicle 170 to a point of origin of the delivery, such as a warehouse. For the case in which delivery vehicle 170 includes subsequent deliveries, the delivery paths of the subsequent deliveries may be considered in determining the range of distance considered for a backup delivery.

In some embodiments of the present invention, backup delivery program 300 makes a real-time decision, at the point and time at which the original delivery is determined to be cancelled or undeliverable, whether to proceed with the backup delivery, or return the one or more items to be delivered to a designated return location, such as the delivery origin. The decision is a consumption of resources-based decision, which may be represented as a cost-based decision associated with the estimated resource consumption. For example, the cost determined to return the product and perform restocking activities, and potentially performing a re-delivery of the product, which consumes fuel, labor, and storage space, is weighed against the cost of discounting the product and the cost of consumption of resources to perform a backup delivery during the on-going delivery trip. In some embodiments, backup delivery program 300 includes additional considerations in making a backup delivery decision, such as whether there is high demand for the product being delivered, and the estimated shelf life of the product if it is returned to storage. Products that are in high demand are readily purchased without discounting, resulting in higher profits, and return and restocking costs may be acceptable for such products. Returned products estimated to have long shelf lives will occupy space that could be used for other products that are more profitable, or more readily deliverable. Backup delivery program 300 receives the information associated with the additional considerations and includes the considerations in determining a decision regarding whether to make a backup delivery, or return the undelivered product.

In other embodiments of the present invention, backup delivery program 300 considers whether the product being delivered has an expiration associated with the product, and includes the additional expiration consideration in determining whether to proceed with a backup delivery or return the product to the delivery point of origin. Returning a product with an associated expiration may result in significant or total reduction of value for the product, and successful backup delivery of the product, even at a discounted price, may produce a more favorable result than returning the product, only to have the product expire. For example, some food items may require delivery within a designated time period, or their quality (and safety) may not be guaranteed. In other cases, a product such as tickets or passes to a scheduled event, once the event time has passed, the product has little or no value.

Figure 2:
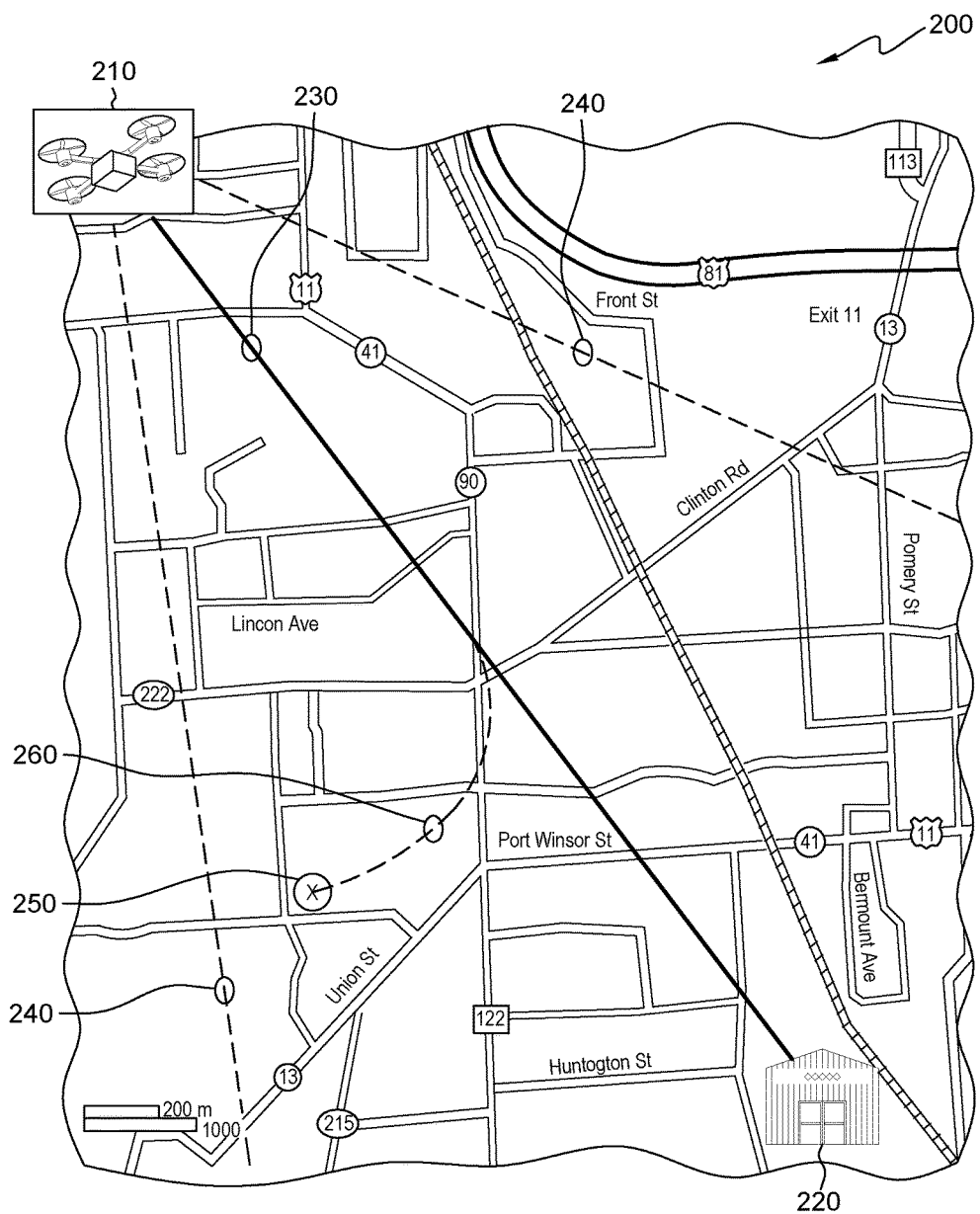
FIG. 2 illustrates and example delivery area including a point of origin, delivery path, delivery destination, and a backup delivery range, in accordance with an embodiment of the present invention.

FIG. 2 illustrates an example delivery area including a point of origin, delivery path, delivery destination, and a backup delivery range, in accordance with an embodiment of the present invention. FIG. 2 includes delivery origin 210, primary delivery destination 220, delivery path 230, backup delivery range boundaries 240 (two boundaries), backup delivery destination 250, and backup delivery path 260.

Delivery origin 210 is the point of departure for a delivery vehicle, for example, delivery vehicle 170, and may be a warehouse in which various products are received and stored until delivery is made. In some embodiments, delivery origin 210 may be a remote distribution point for a delivery service serving one or more retail providers. In other embodiments, delivery origin 210 may be a location of a retailer that also provides delivery of products sold. In some embodiments of the present invention, delivery origin 210 may also be a point of return for products that are undeliverable and for which a backup delivery is not available or not favorable.

Primary delivery destination 220 is a location designated for a current delivery of a particular product and represents the current intended product delivery destination. In some embodiments of the present invention, the current delivery of the product to primary delivery destination 220 has been canceled or due to other circumstances is otherwise determined to be undeliverable.

Delivery path 230 illustrates a planned path of a delivery vehicle, such as delivery vehicle 170, from delivery origin 210 to primary delivery destination 220, for the current delivery of a product. In some embodiments, delivery path 230 is a straight line between delivery origin and primary delivery destination 220, for delivery vehicles that have flight capability or may be nearly a straight line due to wind adjustments or avoidance of tall structures. In other embodiments, delivery vehicle 170 may be a ground-based vehicle and delivery path 230 follows a combination of roadways to reach primary delivery destination 230. In some embodiments, a ground-based delivery vehicle 170 may make multiple deliveries following a combination of individual instances of primary delivery destination 230, in which a second planned delivery originates at the destination of a first planned delivery; however, returns of undeliverable products would be returned to delivery origin 210, if a backup delivery is not determined and made.

Backup delivery boundaries 240 are represented as a pair of dashed lines defining an area extending from delivery path 230. Backup delivery boundaries 240 defines an area in which a backup delivery is determined to be favorable based on the consumption of resources as represented by the cost of delivery to the alternate location as compared to a determined consumption of resources represented by the cost of returning, restocking, and potentially re-delivering the product (without additional conditions applied). In some embodiments of the present invention, backup delivery boundaries 240 is best represented as a circular or elliptical area, and may depend upon the location of delivery origin 210 relative to the distribution of delivery locations in the immediate area. In some embodiments, the area defined by backup delivery boundaries may be pie shaped, but in reverse of the depicted backup delivery boundaries 240 of FIG. 2, having a wider area extending from delivery path 230 near delivery origin 210, and a narrow area extending from delivery path 230, as delivery path 230 approaches primary delivery destination 220. In other embodiments of the present invention, backup delivery boundaries may assume other shapes based on pre-established backup delivery rules and considerations.

Backup delivery destination 250 is a location within the range of backup delivery boundaries 240, and is associated with a buyer of the product determined to be undeliverable to primary delivery destination 220. In some embodiments of the present invention, backup delivery program 300 determines backup delivery destination 250 "on the fly", once backup delivery program 300 determines that the planned delivery cannot be made to primary delivery destination 220. In other embodiments, backup delivery program 300 determines backup delivery boundaries associated with a pending delivery prior to or at the time of departure of the delivery. Backup delivery destination 250 is a location associated with the buyer that has agreed to purchase the undelivered product at a designated price, which may be discounted. Backup delivery program 300 uses data from potential alternate buyer data 160 to determine the potential alternate buyers that are located within a range in which a backup delivery of the undelivered product is favorable, such as backup delivery boundaries 240. Backup delivery program 300 contacts one or more of the potential alternate buyers located within the range defined by backup delivery boundaries 240, and offers delivery of the product, providing a purchasing agreement by the potential customer is received. Having received agreement from a buyer located at backup destination 250, backup delivery program 300 sends instructions to delivery vehicle 170 to navigate to backup destination 250 for delivery, without returning to delivery origin 210.

Backup delivery path 260 depicts a path that delivery vehicle 170 takes after receiving instruction to navigate to backup delivery destination 250.

Figure 3:
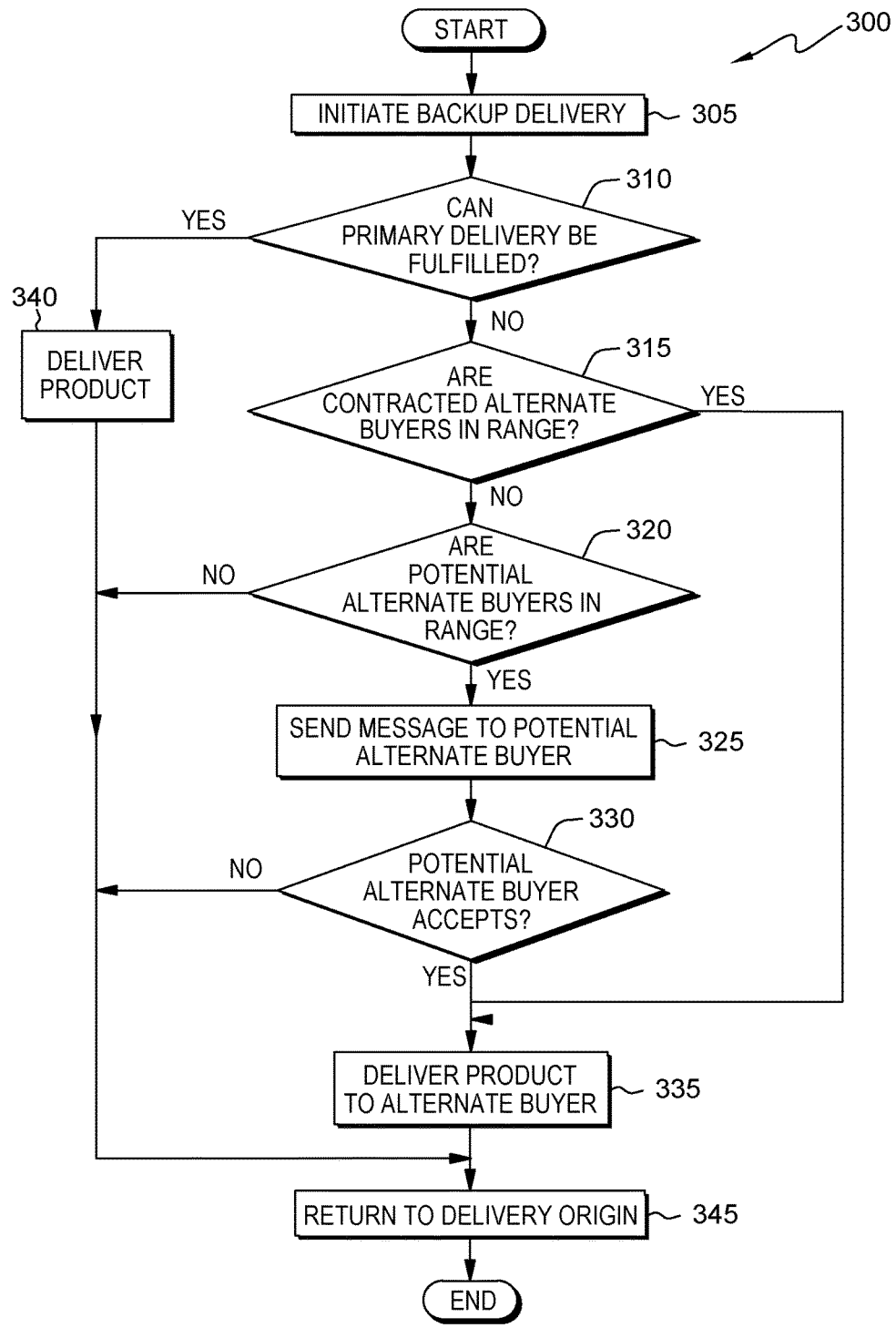
FIG. 3 illustrates operational steps of a backup delivery program, inserted on a server, within the distributed data processing environment of FIG. 1, in accordance with an embodiment of the present invention.

FIG. 3 illustrates operational steps of backup delivery program 300, inserted on server 110, within distributed data processing environment 100 of FIG. 1, in accordance with an embodiment of the present invention. In step 305, backup delivery program 300 is initiated. In some embodiments, backup delivery program 300 is initiated as a delivery departs from a point of origin, such as a warehouse. In other embodiments, backup delivery program 300 is initiated by a user and continuously operates and monitors deliveries that are underway.

For example, in some embodiments, delivery vehicle 170 (FIG. 1) departs from delivery origin 210 (FIG. 2), proceeding to make a planned delivery of a product to primary delivery destination 220. Upon departure of delivery vehicle 170 from delivery origin 210, backup delivery program 300 initiates and receives position, direction, and velocity data from delivery vehicle 170, and monitors for information and/or conditions rendering the product to be undeliverable, due to cancellation or other reasons. In other embodiments, backup delivery program 300 is initiated before the departure of delivery vehicle 170 by user action.

In decision step 310 backup delivery program 300 determines whether the primary delivery of the product can be fulfilled. For the case in which backup delivery program 300 does not receive a cancellation of the delivery, or information indicating that the delivery is at risk, unadvised, or unsafe, backup delivery program 300, in step 310, "YES" branch, determines that the primary delivery can be fulfilled, and allows the delivery to the designated destination to continue, and in step 340 backup delivery program 300 confirms the delivery of the product to the primary delivery destination.

In step 310, "NO" branch, backup delivery program 300 determines that the primary delivery cannot be fulfilled, and backup delivery program 300 proceeds to decision step 315, and determines if there are contracted alternate buyers within a determined range of the delivery vehicle. The determined range may take into account the fuel or energy, labor, time, and other opportunities, available for delivery vehicle 170, and compare the consumption of such resource requirements for a backup delivery to a safe return of the one or more items to be delivered. In other embodiments in which delivery vehicle 170 is making multiple deliveries, the determined range is based on an extension from the planned delivery routes. In some embodiments of the present invention, backup delivery program 300 receives information regarding whether the delivery is canceled, which may be provided by a source of transaction management (not shown in Figures), and communicated to backup delivery program 300. The primary delivery destination may be affected by conditions making the delivery difficult, risky, impractical, or otherwise undeliverable. In some embodiments, a camera included on delivery vehicle 170 may capture and transmit video of the delivery route to server 110 connected to remote control unit 115, which may indicate conditions that are unfavorable to successful delivery, and an operator of remote control unit 115 may provide input to backup delivery program 300 that the delivery is canceled.

In other embodiments, backup delivery program 300 receives input from other sources (i.e., local weather alert) or sensors that are included on delivery vehicle 170 (not shown) regarding conditions that make delivery unfavorable, such as social unrest in the area, emergency vehicles in the area, etc. In yet other embodiments, backup delivery program 300 receives input from a product provider that the delivery is canceled due to payment issues.

In decision step 315, if backup delivery program 300 determines that there are contracted alternate buyers within range for delivery of the current product, then in step 315, "YES" branch, backup delivery program 300 proceeds to step 335, in which the product is delivered to the alternate "contracted" buyer, at a destination determined to be within a safe delivery range of the current position of the delivery vehicle. The alternate contracted buyer has previously confirmed an intent to purchase the particular product that is currently being delivered at an agreed-to price. In some embodiments of the present invention, the confirmation of the alternate buyer binds the buyer to purchase of the product at the agree-to price, if the product becomes available, within an agreed-to time period, after which the agreements expire or require renewal.

In some embodiments of the present invention, backup delivery program 300 determines a plurality of alternate buyers that have confirmed their intent to purchase the product at an agreed-to price, if the product becomes available, from accessing potential alternate buyer data 160, or from delivery data 125 on server 110, for previously determined or considered alternate buyers. Backup delivery program may select an alternate buyer based on the agreed-to price, to recover as much revenue from the sale as possible. In another embodiment, backup delivery program 300 may determine an alternate buyer that is closest to the current position of the delivery vehicle, such as delivery vehicle 170. In yet other embodiments, backup delivery program 300 may send contact messages, such as short message service (SMS) messages to alternate buyers and deliver the product to the first alternate buyer that responds accepting the delivery.

In some embodiments of the present invention, backup delivery program 300 considers additional conditions that may affect a decision to delivery to an alternate buyer that has confirmed to purchase the product at an agreed-to price. Backup delivery program 300 determines known conditions associated with the current product for delivery by accessing data from delivery data 125, which may include, but are not limited to, known level of demand for the product, short supply of the product, possible expiration of the product, estimated shelf life, and shelf space requirements of the returned product. Known conditions and their effects or consequences are considered by backup delivery program

300 in determining consumption of resources and associated costs. In the case in which there is known high demand for the product, backup delivery program 300 may determine that returning the product to the point of origin, such as delivery origin 210 (FIG. 2) and performing a second delivery trip, but at a non-discounted price, may be more favorable. In other cases backup delivery program 300 may determine that the shelf life of the product is estimated to be a longer duration, due to low demand for the product, and alternate buyer delivery at a discounted price may be preferred.

For some instances in which backup delivery program 300 considers delivering to an alternate buyer the product that could not be delivered to a primary destination, backup delivery program 300 considers other factors in making the decision of whether to proceed to deliver to an alternate buyer, or to return the product. Backup delivery program 300 considers and determines the cost of return, re-stock, and re-delivery, and the potential revenue that can be obtained by re-delivery of the product, compared to the loss of revenue from discounting the price, loss of revenue if the product expires by returning and awaiting re-delivery, and the cost of the alternate delivery that deviates from the original planned primary delivery.

For the case in which backup delivery program 300 determines in step 315, "NO" branch, that a contracted alternate buyer is not within range for delivery, backup delivery program 300 proceeds to decision step 320 and determines whether known potential alternate buyers are within a determined range for backup delivery. Backup delivery program 300 accesses potential alternate buyer data 160 and determines whether there are potential alternate buyers that have indicated interest in purchasing the particular product being delivered at an agree-to price, but have not made a contractual confirmation to do so, and whether the potential alternate buyers, if any, are within a range considered for backup delivery.

Backup delivery program 300 determines the potential alternate buyers indicating interest in the particular product, and determines the locations of each potential alternate buyers in relation to the current position of the delivery vehicle, and the planned delivery and return route of the delivery vehicle, such as delivery vehicle 170. In some embodiments of the present invention, the information regarding the potential alternate buyers is obtained from delivery data 125. In other embodiments, the information from delivery data 125 is used to determine whether there are potential alternate buyers, and whether any potential alternate buyers are within a backup delivery range of the current delivery vehicle position or return route, or in the case of a multi-delivery route, whether a potential alternate buyer is within a determined range of the planned delivery route. In yet other embodiments, backup delivery program 300 determines whether there are interested alternate buyers for the undelivered product, and their proximity to delivery vehicle 170, and their proximity to the planned delivery and return route of delivery vehicle 170.

For the case in which backup delivery program 300 determines that there are no potential alternate buyers having interest in the particular product being delivered, or that potential alternate buyers are located outside the determined range for alternate delivery, backup delivery program 300, in step 320, "NO" branch, proceeds to return the product to the delivery origin, in step 340. Backup delivery program 300, accessing information from potential alternate buyer data 160 and delivery data 125, determines whether there are potential alternate buyers having interest in the particular product whose delivery could not be fulfilled. If backup delivery program determines an absence of potential alternate buyers for the particular product, then backup delivery program 300 directs the delivery vehicle to return the product to the delivery origin.

If backup delivery program 300 determines that there are potential alternate buyers with interest in the particular product, then backup delivery program 300 determines the location of the potential alternate buyers and whether potential alternate buyers are within a determined range for backup delivery, such as the range defined by backup delivery range boundaries 240 (FIG. 2). Determining that no potential alternate buyers are within a defined backup delivery range, backup delivery program 300 provides instruction to delivery vehicle 170 to return the particular product to the delivery origin, such as delivery origin 210.

For the case in which backup delivery program 300 determines, in step 320, "YES" branch, that there are one or more potential alternate buyers having an interest in the particular product of the canceled delivery and located within the determined backup delivery range, backup delivery program 300 proceeds to step 325 in which backup delivery program 300 sends SMS messages to the potential alternate buyers, within the pre-defined range for backup delivery. In some embodiments of the present invention, backup delivery program 300 sends SMS messages to one or more of the potential alternate buyers located within the backup delivery range of the delivery vehicle, indicating that the particular product in which the alternate buyer indicated interest, is available for delivery. The SMS message may include a price at which the potential alternate buyer is able to purchase the particular product. In some embodiments of the present invention, the SMS message may indicate a discounted price that was previously indicated by the alternate buyer, at which the alternate buyer would be interested in purchasing the particular product, to encourage the potential alternate buyer to agree to the purchase and delivery. In other embodiments, the SMS message may not offer a discounted price, due to known high demand, from delivery data 125. In yet other embodiments, the SMS message may offer an additionally discounted price to further encourage acceptance of purchase and delivery by the alternate buyer, which may be a result of a known low level of demand, pending expiration of the product, or other condition associated with the particular product.

In some embodiments of the present invention, a non-contractual alternate buyer may be identified by completing an online form on a retailer's or delivery service website. The form solicits information regarding one or more products of interest to the potential alternate buyer, as well as location and payment information. The form includes conditions and/or price of the one or more products in which the potential alternate buyer would consider purchasing the one or more products. The information collected by the online form would be included in potential alternate buyer data 160 and accessed during the "on-the-fly" decision to determine the availability and location of potential alternate buyers for a backup delivery. In some embodiments of the present invention, the determination of potential alternate buyers may be performed prior to or during the primary planned delivery, in anticipation of considering a potential backup delivery.

In other embodiments of the present invention backup delivery program 300 receives social media content and performs natural language processing (NLP) on the content, and may include applying semantic analysis, and sentiment analysis to the parsed and processed content to determine meaning and associations. From the NLP and analysis, backup delivery program 300 determines social media identities and interest level of the identities in one or more products, and may include a price at which the identified potential alternate buyer may purchase the one or more products. The data from the NLP, semantic analysis, and sentiment analysis is stored in potential alternate buyer data 160, associated with an identity of a potential buyer, and is accessed by backup delivery program 300 to determine potential alternate buyers for a backup delivery. In some embodiments of the present invention, the data from the NLP, semantic, and sentiment analysis is accessed by backup delivery program "on-the-fly", during the delivery attempt of the planned primary delivery that has been canceled or determined to be undeliverable.

Backup delivery program 300 monitors for responses to the SMS messages sent to contact potential alternate buyers for a backup delivery of the particular product. In decision step 330, backup delivery program 300 determines whether a potential buyer accepts the backup delivery. For the case in which backup delivery program 300 does not receive an acceptance from a potential alternate buyer within a pre-determined period of time, then in step 330, "NO" branch, backup delivery program 300 instructs the delivery vehicle to return the particular product to the delivery origin. For example, having determined that potential alternate buyers are available and are located within the pre-defined range for backup delivery, backup delivery program has sent SMS messages to each identified potential alternate buyer within the backup delivery range. After a period of time of monitoring for a response to the sent SMS messages, which may relate to cost and/or remaining fuel or duration of a backup delivery, if a response accepting and committing to purchase of the product in a backup delivery is not received from a potential alternate buyer, backup delivery program 300 provides instruction to delivery vehicle 170 to return to delivery origin 210 without making a backup delivery.

For the case of step 330, "YES" branch, in which backup delivery program 300 determines that a potential alternate buyer accepts the backup delivery of the particular product, backup delivery program 300, in step 335, delivers the product to the alternate buyer. For example, backup delivery program receives a response from a potential alternate buyer to which a message was sent indicating that a particular product, in which the potential alternate buyer had indicated interest, is available, and provided information regarding the price and other conditions of the backup delivery. The potential alternate buyer responds accepting the backup delivery at the price and conditions indicated from backup delivery program 300. In some embodiments of the present invention, the acceptance of the backup delivery includes a confirmation of payment for the delivery of the particular product. In other embodiments, a confirmation of payment may be an additional step in an exchange of messages between backup delivery program 300, the alternate buyer, and in some cases a third party payment service.

In some embodiments of the present invention, in receiving an accepting response for the backup delivery of the particular product, backup delivery program 300 may select the first responding potential alternate buyer that accepts the backup delivery. In other embodiments, if many responses are received, backup delivery program 300 may choose a response from an alternate buyer that results in the purchase of the product at the highest agreed-to price or, in yet other embodiments, backup delivery program 300 may choose a committed response from an alternate buyer whose location is closest to the current delivery vehicle position.

In some embodiments of the present invention, backup delivery program 300 may perform an online real-time auction, which includes a time limit, in which contacted potential alternate buyers of the undelivered product, submit price bids for the product. The bids may be made by SMS messages, on which backup delivery program 300 performs NLP, and acceptance of the bids are sent to the potential alternate buyers included in the auction. Backup delivery program 300 selects the potential alternate buyer submitting the highest committed bid in real-time, during the delivery, but within the time constraints of the auction.

After receiving an accepting response from an alternate buyer (and assuming confirmation of payment conditions or arrangements), in step 335, backup delivery program 300 provides instruction (i.e., navigational data) to the delivery vehicle to deliver the product to the alternate buyer. The navigational data transmitted to the delivery vehicle, by backup delivery program 300 identifies the alternate buyer selected, and includes the location of the alternate buyer.

In step 345, backup delivery program 300 provides instruction to the delivery vehicle to return to the delivery origin. In some embodiments of the present invention, in which delivery of the particular product to the primary delivery destination 220 is completed (step 340), backup delivery program 300 transmits navigational data to communication component 190 of delivery vehicle 170 to return to delivery origin 210 as a designated return location. In another embodiment of the present invention in which backup delivery program 300 determines an absence of potential alternate buyers for a backup delivery (step 320, "NO" branch), backup delivery program 300 transmits navigational data to delivery vehicle 170 to return the particular product to delivery origin 210. In yet other embodiments, in response to failing to receive an acceptance by a potential alternate buyer to purchase and receive a backup delivery of the particular product (step 330, "NO" branch), backup delivery program 300 provides instruction to delivery vehicle 170 to return the particular product to delivery origin 210. In embodiments of the present invention in which a backup delivery of the particular product is completed (step 335), backup delivery program 300 provides instruction to delivery vehicle 170 to return to delivery origin 210. In some embodiments of the present invention, delivery vehicle 170 may be configured to make additional deliveries prior to returning to delivery origin 210, and in other embodiments, delivery vehicle may be instructed to return to a destination other than the origin point of the current set of deliveries.

In some embodiments of the present invention, backup delivery program 300 resides on a computer-readable storage device included on delivery vehicle 170, and is operated by one or more processors included on delivery vehicle 170. In some embodiments, decisions to make a backup delivery are determined by backup delivery program 300 in real-time in which the planned delivery has been canceled after delivery vehicle 170 has begun travel to make the delivery.

The following includes further description of a possible implementation of embodiments of the present invention:

Configuration of a system to determine and provide a backup delivery within distributed computer processing environment 100 depends on the implementer's choice of how the system will work. Many capabilities are provided, and the business owning the delivery vehicle will have decisions as to how the system should be set up.

The business may have collected information through a web site regarding users who would sign up for a backup delivery program. The potential customers may have set up a contract to be used in such situations that may include automated billing capability, and an expiration date for the contract, or may involve simply telling the business to text him when the situation occurs and the decision could be made at that time. There are a set of decisions for the business implementing a backup delivery to decide as to how they want to handle situations.

If a pre-contract is not used, another scenario may be that the business collects information (name, address, phone number) for potential buyers that may be willing to receive special offers on failed deliveries to other addresses. A radius may be set ahead of time by the business, such that customers within a particular range of the delivery vehicle will be afforded the opportunity for the delivery. The delivery may include a discounted purchase, or the delivery may be the availability of an item that is in high demand, but short supply. The radius may be granular. The radius to be calculated will include the radius from the point of discovery (when we discover the package delivery to the original owner will not happen), and the radius also applies to points along the path back to the warehouse as well.

If any in-progress delivery order is cancelled, or for other reasons the drop off point is deemed unattainable, then software installed in the delivery vehicle will understand two possible choices. Choice one is a return to the warehouse, and choice 2 is to find a backup plan, if possible. The delivery vehicle will first determine its distance back to the warehouse (starting point and point of return), and calculate the overall cost for returning to the warehouse for a later delivery of the same product. The cost determination takes into account that travel back to the warehouse, labor to restock the item, labor to subsequently prepare the item for later delivery, and the re-delivery of the item. The cost of labor (and convenience factor) would be weighed, as would the actual cost of a round trip of the delivery vehicle, considering energy and maintenance. The system would also need to determine how much energy the delivery vehicle has available in order to determine how far out of the way a backup delivery could be made with consideration of any back up plan. The system would find out if there are any users under contract within the given radius that could accept this exact product with the given terms of the contract, for example, a discounted price. In some cases a match is found, and the system determines the cost favorability of whether to proceed with a backup delivery.

In one scenario, the system would compare the costs of a return against a business pre-defined threshold. If that threshold is exceeded, the backup delivery is implemented. In a more robust scenario, the system would compare the costs of return against the determined cost for making a delivery to the Plan B user. May factors may be taken into account, such as the exact distance from the current location on the original delivery and return path, to the backup delivery location. The distance from the return path to make the delivery, plus the return path from the location of the backup delivery, is compared to the return path from the location at which the delivery vehicle received notification of that the planned delivery was undeliverable. The travel costs are determined and compared as well as considering any potential loss of profit.

Predictive analytics comes into play. If product X will not sell out, then the business would be more likely to take less profit on the delivery, whereas if the product was in very high demand, a premium price may be attainable, and return and re-delivery may be a more appropriate decision. Another consideration is whether the product has an expiration. If the product being delivered is about to expire in 1 day, or if the product is a set of tickets to a game or show that must be used immediately, then the business is more likely to accept any deal, even at a loss of profit.

The business rules would be pre-set and include conditions for which profit reduction or loss would be acceptable. The business rules would be set on a granular level, product by product (since some products can stay on the shelves indefinitely, while others require timely delivery. Based on the discovery of a current delivery being determined to be undeliverable, a decision would be made as to whether to return to the warehouse (starting point), or to proceed with an identified pre-configured contracted backup delivery, or to send out messages to other users willing to accept messages having interest in price-favorable deals for the particular product being delivered.

One possible scenario is that it is not desirable to return the product, and there are no known contracted users within a reachable vicinity for a backup delivery. In this case, SMS messages may be sent out to known users within the pre-defined radius vicinity to see if there is anyone interested in making a purchase of the product at a determined, and likely attractive, price. Embodiments of the present invention determined the acceptable discounted price, based on conditions and factors described above, and determines a price at which the product is offered for purchase. At this point the discounted price may be shared with the known users or, in other embodiments, the product may be offered as an item to auction. A more targeted approach may be used in which a historical analysis of purchases, indicators, or mentions of interest in the particular product, may be determined by performing analytics on available sources of media, such as retailer records, retail web sites, shopping cart data, wish list data, forums, blogs, chats and question-answer online sites. Analytics could be performed in this regards so that not everybody is bothered, but some folks more likely to take the bait are bothered.

Identified users within the designated radius of the delivery vehicle will be sent a message, with or without a price. Responses could be handled in several manners. One approach is that the first confirmed positive response receives the backup delivery. Another approach is to allow responses that include price bids, and the highest bid exceeding a minimum determined by the business, wins delivery. In response to confirming the response of a contracted user, or contacted user agreeing or bidding on an accepted price, the confirmed user is notified that, for example by SMS message, the backup delivery is on its way. The user's location is known from the potential-buyer database, and the GPS coordinates of the user are provided to the delivery vehicle, which determines the location and delivers the product or items. If, however, an alternate recipient of the product is not located within the pre-determined range of a backup delivery, embodiments of the present invention return the product to the warehouse.

As an additional capability, cross selling to users that have shown interest in related products in the past are included as potential backup delivery recipients that are targeted. In this case the capability to access media sources and determine from analysis of the content, users that have shown interest in particular products and the location of the users. In this manner messages can be sent directly to those who would have interest in a particular product and not annoy others with the SMS messages.

Figure 4:
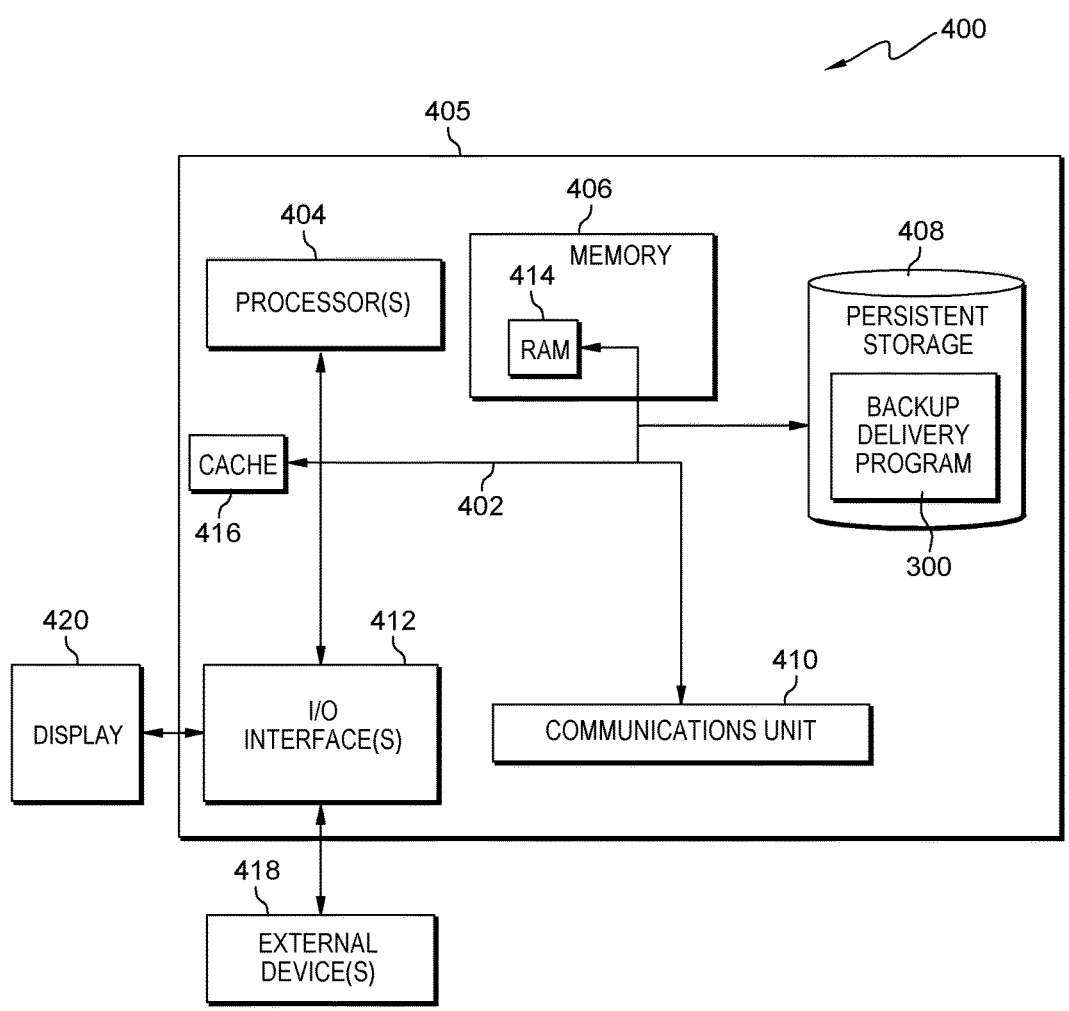
FIG. 4 depicts a block diagram of components of a server computer capable of operationally performing the backup delivery program, in accordance with an embodiment of the present invention.

FIG. 4 depicts a block diagram of components of computing system 400, including server computer 405, capable of operationally performing backup delivery program 300, in accordance with an embodiment of the present invention.

Server computer 405 includes components and functional capability similar to server 110, and computing devices 170 (FIG. 1), in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Computing device 405 includes communications fabric 402, which provides communications between computer processor(s) 404, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406, cache memory 416, and persistent storage 408 are computer readable storage media. In this embodiment, memory 406 includes random access memory (RAM) 414. In general, memory 406 can include any suitable volatile or non-volatile computer readable storage media.

Backup delivery program 300 is stored in persistent storage 408 for execution by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of distributed data processing environment 100. In these examples, communications unit 410 includes one or more network interface cards. Communications unit 410 may provide communications through the use of either or both physical and wireless communications links. Backup delivery program 300 may be downloaded to persistent storage 408 through communications unit 410.

I/O interface(s) 412 allows for input and output of data with other devices that may be connected to computing system 400. For example, I/O interface 412 may provide a connection to external devices 418 such as a keyboard, keypad, a touch screen, and/or some other suitable input device. External device(s) 418 can also include portable computer readable storage media such as, for example, thumb drives, portable optical or magnetic disks, and memory cards. Software and data used to practice embodiments of the present invention, e.g., backup delivery program 300, can be stored on such portable computer readable storage media and can be loaded onto persistent storage 408 via I/O interface(s) 412. I/O interface(s) 412 also connect to a display 420.

Display 420 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing a back-up delivery by a delivery vehicle, the method comprising:

transmitting, by one or more processors, to navigational components of a delivery vehicle, navigation data to a first location on a delivery route for a first delivery, wherein the delivery route is determined from the navigation data that is received by a communications component of the delivery vehicle and processed by a GPS component of the delivery vehicle, which has access to navigational mapping data;

transmitting, by one or more processors, respective location data for a pre-determined set of potential buyers of an item included in the first delivery to the navigational components of the delivery vehicle and data indicating whether one or more of the pre-determined set of potential buyers has an existing commitment to purchase the item at an agreed-to price;

receiving, by one or more processors, a notification that the first delivery to the first location is canceled subsequent to the delivery vehicle departing for the first delivery;

responsive to determining in real-time that a backup delivery is available, comparing, by one or more processors, the location of the one or more of the pre-determined set of potential buyers, respectively, to a current location of the delivery vehicle, as determined by the GPS component of the delivery vehicle;

determining in real-time, by one or more processors, a consumption of resources of the delivery vehicle to deliver, respectively, the item included in the first delivery to each of the one or more of the pre-determined set of potential buyers that has an existing commitment to purchase the item at an agreed-to price;

determining in real-time, by one or more processors, the consumption of resources of the delivery vehicle to return the item included in the first delivery to a designated return location;

determining, by one or more processors, whether the consumption of resources of the delivery vehicle to perform the backup delivery to a buyer of the one or more of the pre-determined set of potential buyers that has the existing commitment to purchase the item at the agreed-to price, is favorable as compared to the consumption of resources to return the item to the designated return location;

in response to determining that performing the backup delivery to the buyer of the one or more of the pre-determined set of potential buyers that has the existing commitment to purchase the item at the agreed-to price is favorable, determining, by one or more processors, whether performing the backup delivery to a particular buyer of the one or more of the pre-determined set of potential buyers that has the existing commitment to purchase the item at the agreed-to price is more favorable as compared to others of the one or more of the pre-determined set of potential buyers; and in response to determining that performing the backup delivery to the particular buyer at the agreed-to price is more favorable, delivering, by the one or more processors, the item included in the first delivery to the particular buyer that has the existing commitment to purchase the item at the agreed-to price, by sending the location data for the particular buyer to the navigational components of the delivery.

2. The method of claim 1, further comprising:
in response to determining the consumption of resources for performing the backup delivery is unfavorable for each of the pre-determined set of potential buyers as compared to returning the one or more items of the first delivery to the designated return location, one or more processors notifying the delivery vehicle to return the one or more items of the first delivery to the designated return location.

3. The method of claim 1, wherein the delivery vehicle is a remotely controlled vehicle.

4. The method of claim 1, further comprising:
in response to determining a second location is within a pre-defined proximity of the return route, confirming, by one or more processors, the particular potential buyer at the second location agrees to receive the one or more items of the first delivery, wherein confirming includes an agreed-to commitment.

5. The method of claim 1, wherein determining whether the backup delivery can be made to a potential buyer of the pre-determined set of potential buyers, and the potential buyer located within a pre-defined proximity of the delivery route to which the first delivery can alternatively be delivered, includes a real-time auction of the one or more items to a potential buyer of the pre-determined set of potential buyers.

6. The method of claim 1, further comprising:
wherein the estimated costs of the consumption of resources to return the one or more items to be delivered to the designated return location includes a determination while in progress of making a first delivery, of whether to perform the backup delivery, and includes consideration of additional factors associated with the return of the one or more items to the storage location; and
wherein the additional factors include one or a combination of: expiration of the one or more items, level of consumer demand of the one or more items, supply availability of the one or more items, and estimated storage space and storage duration required for a return of the one or more items.

7. The method of claim 1, wherein determining whether the backup delivery is available within a pre-defined proximity of the delivery route, by accessing a location of one or more of a pre-determined set of potential buyers of the one or more items, further comprises:
transmitting, by one or more processors, notification to potential buyers of the pre-determined set of potential buyers for the one or more items, within the pre-defined proximity of the delivery route, regarding the availability of the one or more items of the first delivery as the backup delivery at a designated price; and
determining, by one or more processors, whether a particular potential buyer at a second location agrees to purchase the one or more items of the first delivery at the designated price.

8. The method of claim 7, wherein at least one of the potential buyers of the pre-determined set of potential buyers of the one or more items, located within the pre-defined proximity of the delivery route, are determined by analysis of available social media sources containing information generated by the potential buyers.

9. The method of claim 1, further comprising:
determining, by one or more processors, whether an expiration condition exists that affects a value associated with the item included in the first delivery; and
in response to determining the item included in the first delivery has an expiration condition, notifying, by the one or more processors, one or more of the pre-determined set of potential buyers that has an interest in the item without an existing commitment to purchase the item at the agreed-to price that the item included in the first delivery is up for auction, and delivering the item to the location data of a highest bidder among the notified potential buyers of the pre-determined set of potential buyers.

10. A computer program product comprising:
one or more computer readable storage medium, and program instructions stored on the one or more computer readable storage devices, the program instructions comprising:
program instructions to transmit to navigational components of a delivery vehicle, navigation data to a first location on a delivery route for a first delivery, wherein the delivery route is determined from the navigation data that is received by a communications component of the delivery vehicle and processed by a GPS component of the delivery vehicle, which has access to navigational mapping data;
program instructions to transmit respective location data for a pre-determined set of potential buyers of an item included in the first delivery to the navigational components of the delivery vehicle and data indicating whether one or more of the pre-determined set of potential buyers has an existing commitment to purchase the item at an agreed-to price;
program instructions to receive a notification that the first delivery to the first location is canceled subsequent to the delivery vehicle departing for the first delivery;
program instructions to determine in real-time whether a backup delivery is available, by comparing the location data of the one or more of the pre-determined set of potential buyers, respectively, to a current location of the delivery vehicle, as determined by the GPS component of the delivery vehicle;
program instructions to determine in real-time, a consumption of resources of the delivery vehicle to deliver, respectively, the item included in the first delivery to each of the one or more of the pre-determined set of potential buyers that has an existing commitment to purchase the item at an agreed-to price;
program instructions to determine in real-time, the consumption of resources of the delivery vehicle to return the item included in the first delivery to a designated return location;
program instructions to determine whether the consumption of resources of the delivery vehicle to perform the backup delivery to a buyer of the one or more of the pre-determined set of potential buyers that has the existing commitment to purchase the item at the agreed-to price, is favorable as compared to the consumption of resources to return the item of the first delivery to the designated return location;
in response to determining the consumption of resources of the delivery vehicle to perform the backup delivery to the buyer of the one or more of the pre-determined set of potential buyers is favorable, program instructions to determine whether performing the backup delivery to a particular buyer of the one or more of the pre-determined set of potential buyers that has the existing commitment to purchase the item at the agreed-to price is more favorable as compared to others of the one or more of the pre-determined set of potential buyers; and in response to determining the consumption of resources of the delivery vehicle to perform the backup delivery to the particular buyer that has the existing commitment to purchase the item at the agreed-to price is more favorable, program instructions to deliver the item included in the first delivery to the particular buyer, by sending the location data for the particular buyer to the navigational components of the delivery vehicle.

11. The computer program product of claim 10, wherein the delivery vehicle is a remotely controlled vehicle, and the remotely controlled vehicle includes flight capability.

12. The computer program product of claim 10, further comprises:

wherein program instructions for the estimated costs of the consumption of resources to return the one or more items to be delivered to the designated return location includes a determination while in progress of making a first delivery, of whether to perform the backup delivery, and includes consideration of additional factors associated with the return of the one or more items to the storage location; and wherein program instructions for the additional factors include one or a combination of: expiration of the one or more items, level of consumer demand of the one or more items, supply availability of the one or more items, and estimated storage space and storage duration required for a return of the one or more items.

13. The computer program product of claim 10, wherein determining whether the backup delivery is available within a pre-defined proximity of the delivery route, by accessing a location of one or more of a pre-determined set of potential buyers of the one or more items, further comprises:

program instructions to transmit a notification to potential buyers of the pre-determined set of potential buyers for the one or more items, within the pre-defined proximity of the delivery route, regarding the availability of the one or more items of the first delivery as a backup delivery at a designated price; and program instructions to determine whether a particular potential buyer at a second location agrees to purchase the one or more items of the first delivery at the designated price.

14. The computer program product of claim 13, wherein at least one of the potential buyers of the pre-determined set of potential buyers of the one or more items, located within the pre-defined proximity of the delivery route, are determined by analysis of available social media sources containing information generated by potential buyers.

15. A computer system comprising:

one or more computer processors, one or more computer readable storage devices, program instructions stored on the computer readable storage devices for execution by at least one of the one or more processors, the program instructions comprising:

program instructions to transmit to navigational components of a delivery vehicle, navigation data to a first location on a delivery route for a first delivery, wherein the delivery route is determined from the navigation data that is received by a communications component of the delivery vehicle and processed by a GPS component of the delivery vehicle, which has access to navigational mapping data;

program instructions to transmit respective location data for a pre-determined set of potential buyers of an item included in the first delivery to the navigational components of the delivery vehicle and data indicating whether one or more of the pre-determined set of potential buyers has an existing commitment to purchase the item at an agreed-to price;

program instructions to receive a notification that the first delivery to the first location is canceled subsequent to the delivery vehicle departing for the first delivery;

responsive to determining whether a backup delivery is available, program instructions to compare the location data of the one or more of the pre-determined set of potential buyers, respectively, to a current location of the delivery vehicle, as determined by the GPS component of the delivery vehicle;

program instructions to determine in real-time, a consumption of resources of the delivery vehicle to deliver, respectively, the item included in the first delivery to each of the one or more of the pre-determined set of potential buyers that has an existing commitment to purchase the item at an agreed-to price;

program instructions to determine in real-time, the consumption of resources of the delivery vehicle to return the item to a designated return location;

program instructions to determine whether the consumption of resources of the delivery vehicle to perform the backup delivery to a buyer of the one or more of the pre-determined set of potential buyers that has the existing commitment to purchase the item at the agreed-to price, is favorable as compared to the consumption of resources to return the item included in the first delivery to the designated return location;

in response to determining that performing the backup delivery to the buyer of the one or more of the pre-determined set of potential buyers is favorable, program instructions to determine whether performing the backup delivery to a particular buyer of the one or more of the pre-determined set of potential buyers that has the existing commitment to purchase the item at the agreed-to price is more favorable as compared to others of the one or more of the pre-determined set of potential buyers; and in response to determining that performing the backup delivery to the particular buyer at the agreed-to price is favorable, program instructions deliver the item included in the first delivery to the particular buyer that has the existing commitment to purchase the item at the agreed-to price, by sending the location data for the particular buyer to the navigational components of the delivery vehicle.

16. The computer system of claim 15, wherein determining whether the backup delivery is available within a pre-defined proximity of the delivery route, by accessing a location of one or more of a pre-determined set of potential buyers of the one or more items, further comprises:

program instructions to transmit a notification to potential buyers of the pre-determined set of potential buyers for the one or more items, within the pre-defined proximity of the delivery route, regarding the availability of the one or more items of the first delivery as a backup delivery at a designated price; and program instructions to determine whether a particular potential buyer at a second location agrees to purchase the one or more items of the first delivery at the designated price.

17. The computer system of claim 15, wherein determining whether the backup delivery can be made to a potential buyer of the pre-determined set of potential buyers, and the potential buyer located within a pre-defined proximity of the delivery route to which the first delivery can alternatively be delivered, includes a real-time auction of the one or more items to a potential buyer of the pre-determined set of potential buyers.

\* \* \* \* \*